(12) United States Patent
Ishikawa et al.

(10) Patent No.: US 9,038,904 B2
(45) Date of Patent: May 26, 2015

(54) CARD READER

(71) Applicant: NIDEC SANKYO CORPORATION, Nagano (JP)

(72) Inventors: Kazutoshi Ishikawa, Nagano (JP); Kazunori Takahashi, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/122,957

(22) PCT Filed: Jan. 15, 2013

(86) PCT No.: PCT/JP2013/050535
§ 371 (c)(1),
(2) Date: Nov. 27, 2013

(87) PCT Pub. No.: WO2013/118538
PCT Pub. Date: Aug. 15, 2013

(65) Prior Publication Data
US 2014/0346228 A1      Nov. 27, 2014

(30) Foreign Application Priority Data

Feb. 9, 2012   (JP) .................................. 2012-026386

(51) Int. Cl.
G06K 7/00 (2006.01)
G06K 7/08 (2006.01)
G06K 13/06 (2006.01)
G06K 13/08 (2006.01)
G11B 5/008 (2006.01)

(52) U.S. Cl.
CPC .............. *G06K 7/0004* (2013.01); *G06K 7/082* (2013.01); *G06K 7/003* (2013.01); *G06K 13/06* (2013.01); *G06K 13/08* (2013.01); *G11B 5/00808* (2013.01)

(58) Field of Classification Search
USPC ................. 235/440, 449, 475, 477, 483, 485
IPC .................... G06K 7/0004,7/084, 13/08, 13/07, G06K 13/06
See application file for complete search history.

(56) References Cited

U.S. PATENT DOCUMENTS

2014/0217169 A1* 8/2014 Lewis et al. .................. 235/379

FOREIGN PATENT DOCUMENTS

JP     09-128872 A    5/1997
JP     2000-048146 A  2/2000

OTHER PUBLICATIONS

International Search Report for International Application No. PCT/JP2013/050535; Date of Mailing: Apr. 16, 2013, with English Translation.

* cited by examiner

*Primary Examiner* — Karl D Frech
(74) *Attorney, Agent, or Firm* — Cantor Colburn LLP (57) ABSTRACT

A card reader may include a card conveying mechanism structured to convey the card; a magnetic head which is structured to abut with the card and performs at least one of reading of magnetic data recorded on the card and recording of magnetic data on the card; a head moving mechanism structured to move the magnetic head in a longitudinal direction of the card; and an abutting part structured to abut with one end of the card in the short-side direction of the card. The head moving mechanism may be configured such that, while the card conveying mechanism holds the card in a state that the one end of the card in the short-side direction of the card is pressed against the abutting part, the magnetic head is moved in the longitudinal direction of the card to perform at least one of reading and recording of magnetic data.

9 Claims, 5 Drawing Sheets

CARD READER

CROSS REFERENCE TO RELATED APPLICATIONS

This is a U.S. national stage of International Application No. PCT/JP2013/050535, filed on Jan. 15, 2013. Priority under 35 U.S.C. §119(a) and 35 U.S.C. §365(b) is claimed from Japanese Application No. 2012-026386, filed Feb. 9, 2012, the disclosure of which is also incorporated herein by reference.

FIELD OF THE INVENTION

The present invention relates to a card reader in which a card formed in a substantially rectangular shape is carried in its short-side direction and processed.

BACKGROUND

Conventionally, a magnetic head moving type magnetic stripe reading/writing device has been known in which reading and writing of magnetic data are performed on a magnetic stripe formed on a magnetic medium (see, for example, Patent Literature 1). In a magnetic medium which is to be processed in the magnetic stripe reading/writing device described in Patent Literature 1, a magnetic stripe is formed in a direction perpendicular to its conveying direction, and the magnetic stripe reading/writing device includes a slide mechanism for moving the magnetic head in a direction in which the magnetic stripe is formed and conveying rollers for conveying the magnetic medium in a direction perpendicular to the moving direction of the magnetic head.

[PTL 1] Japanese Patent Laid-Open No. Hei 9-128872

A shape of a card having a magnetic stripe is specified in the international standard and JIS standard and is formed in a substantially rectangular shape whose four corners are rounded. The magnetic stripe is formed in a strip shape which is parallel to a longitudinal direction of the card formed in a substantially rectangular shape. Further, a position of the magnetic stripe in the short-side direction of the card formed in a substantially rectangular shape is specified in the international standard and JIS standard and the magnetic stripe is formed within a predetermined range with one end of the card in the short-side direction of the card as a reference.

Like a magnetic stripe reading/writing device described in Patent Literature 1, in a case that a card with a magnetic stripe in conformity with the international standard and JIS standard is to be processed in a device in which a magnetic medium is conveyed in a direction perpendicular to the direction of the magnetic stripe, the card is conveyed in its short-side direction. Further, as described above, in a card with a magnetic stripe in conformity with the international standard and JIS standard, the magnetic stripe is formed within a predetermined range with one end of the card in the short-side direction of the card as a reference. Therefore, when a card with a magnetic stripe in conformity with the international standard and JIS standard is to be processed in this device, positions of the magnetic head and the magnetic stripe may be displaced from each other when reading and writing of magnetic data are to be performed and, as a result, reading and writing accuracy of magnetic data may be lowered.

SUMMARY

In view of the problem described above, at least an embodiment of the present invention provides a card reader which is capable of restraining lowering of reading accuracy and record accuracy of magnetic data even when a card with a magnetic stripe in conformity with the international standard and JIS standard is conveyed in its short-side direction and processed.

To achieve the above, as least an embodiment of the present invention provides a card reader in which a card formed in a substantially rectangular shape is conveyed in a short-side direction of the card and processed, includes a card conveying mechanism structured to convey the card, a magnetic head which is structured to abut with the card and performs at least one of reading of magnetic data recorded on the card and recording of magnetic data on the card, a head moving mechanism structured to move the magnetic head in a longitudinal direction of the card, and an abutting part structured to abut with one end of the card in the short-side direction of the card. In the card reader, while the card conveying mechanism holds the card in a state that the one end of the card in the short-side direction of the card is pressed against the abutting part, the magnetic head is moved in the longitudinal direction of the card to perform at least one of reading and recording of magnetic data.

In the card reader in accordance with at least an embodiment of the present invention, while the card conveying mechanism holds the card in a state that the one end of the card in the short-side direction of the card is pressed against the abutting part, the magnetic head is moved in the longitudinal direction of the card to perform at least one of reading and recording of magnetic data. In other words, in at least an embodiment of the present invention, in a card with a magnetic stripe in conformity with the international standard and JIS standard, at least one of reading and recording of magnetic data is performed by moving the magnetic head while the card is held in a state that the one end of the card, which is the reference of a forming range of the magnetic stripe, is pressed against the abutting part. Therefore, aligning of the magnetic head with the magnetic stripe are performed with a high degree of accuracy before reading and/or recording of magnetic data are performed and, in addition, when reading and/or recording of magnetic data are performed while the magnetic head is abutted with the card and moved along the card, positional displacement of the card is capable of being prevented. Accordingly, in at least an embodiment of the present invention, even when a card with a magnetic stripe in conformity with the international standard and JIS standard is conveyed in its short-side direction and processed, lowering of reading accuracy and recording accuracy of magnetic data is restrained.

In at least an embodiment of the present invention, the card conveying mechanism includes, for example, a conveying roller which is structured to abut with the card to convey the card and a pad roller which is urged toward the conveying roller, and the conveying roller and the pad roller hold the card between the conveying roller and the pad roller in the state that the one end of the card in the short-side direction of the card is pressed against the abutting part. In this case, it is preferable that the card is provided with an embossing area where embossing is performed and that the conveying roller and the pad roller are abutted with a portion of the card avoiding the embossing area on both end sides of the card in the longitudinal direction of the card. According to this structure, when reading and/or recording of magnetic data are to be performed, a flat portion of a card avoiding the embossing area of the card is held between the conveying roller and the pad roller and thus a holding force for the card can be increased. Therefore, positional displacement of the card is prevented effectively when reading and/or recording of magnetic data are performed by moving the magnetic head while the magnetic head is abutted with the card. Further, according to this structure, the conveying roller and the pad roller do not abut with the embossment formed by embossing and thus damage of the embossment, damage of coating on the embossed portion and the like are prevented.

In at least an embodiment of the present invention, it is preferable that the card reader includes a card conveying passage where the card is conveyed, and a retreating mechanism by which the abutting part is retreated from the card conveying passage. The card conveying mechanism includes a second conveying roller, which is disposed on a back side in a taking-in direction of the card with respect to the abutting part and is structured to abut with the card and convey the card, and a second pad roller which is urged toward the second conveying roller. According to this structure, when the abutting part is retreated, a card can be conveyed to the back side in the taking-in direction of the card by the second conveying roller and the second pad roller. Therefore, various operations can be performed on a card and/or the card can be collected on the back side in the taking-in direction of the card.

In at least an embodiment of the present invention, it is preferable that the card reader includes a card detection mechanism for detecting that a card is inserted into the card reader, and the card detection mechanism detects that the card is inserted into the card reader by detecting both end sides of the card in a longitudinal direction of the card. According to this structure, for example, in a case that a card is inserted into the card reader so that the card is conveyed in a longitudinal direction of the card and that both end sides in the longitudinal direction of the card are not detected by the card detection mechanism, it may be structured that the card is not taken into the card reader by the card conveying mechanism. In a case that a card inserted in a longitudinal direction of the card is to be taken into the card reader, when a criminal attaches a magnetic head to the card insertion part of the card reader, magnetic data recorded in the magnetic stripe may be capable of being illegally acquired through the magnetic head. However, according to the above-mentioned structure, it can be structured that a card inserted in a longitudinal direction of the card is not taken into the card reader and thereby so-called skimming in which magnetic data are illegally acquired through the magnetic head attached by a criminal is prevented. Further, when a card inserted in a longitudinal direction of the card is taken into the card reader, the magnetic head may be moved in a widthwise direction of the magnetic stripe formed in a strip shape (in other words, in a short-side direction of the card) and thus the magnetic stripe may be scratched and damaged in the widthwise direction of the magnetic stripe. When the magnetic stripe is scratched in the widthwise direction of the magnetic stripe, a reading error of magnetic data is easily occurred. However, according to the above-mentioned structure, it can be structured that a card inserted in a longitudinal direction of the card is not taken into the card reader and thus occurrence of scratching and damage of the magnetic stripe in the widthwise direction of the magnetic stripe is prevented.

In at least an embodiment of the present invention, it is preferable that the card reader includes a card insertion part in which an insertion port into which the card is inserted is formed, and the card insertion part includes a shutter member structured to close a back side of the insertion port in the taking-in direction of the card. According to this structure, when reading and/or recording of magnetic data are being performed, the card can be prevented from being pulled out from the card reader and thus appropriate reading and/or recording of magnetic data can be performed.

In at least an embodiment of the present invention, it is preferable that, in a state that the one end of the card in the short-side direction of the card is abutted with the abutting part, the entire card is taken into an inside of the card reader. According to this structure, when reading and/or recording of magnetic data are being performed, the card is prevented from being pulled out from the card reader and thus appropriate reading and/or recording of magnetic data can be performed.

In at least an embodiment of the present invention, it is preferable that the card reader includes IC contact springs structured to contact with external connection terminals formed on the card and, while the card conveying mechanism holds the card in a state that the one end of the card in the short-side direction of the card is pressed against the abutting part, the IC contact springs are contacted with the external connection terminals to exchange data. In a card in conformity with the international standard and JIS standard, a dimensional tolerance of the external connection terminals in the short-side direction of the card is severer than a dimensional tolerance of the external connection terminals in the longitudinal direction of the card. However, according to this structure, aligning of the external connection terminals with the IC contact springs before data are exchanged is performed with a high degree of accuracy and, in addition, positional displacement of the card is prevented when data are being exchanged. Therefore, the external connection terminals and the IC contact springs are appropriately contacted with each other and data are appropriately exchanged.

In at least an embodiment of the present invention, it is preferable that the card reader includes IC contact springs structured to contact with external connection terminals formed on the card and, in a state that the IC contact springs press the external connection terminals, the magnetic head is moved in the longitudinal direction of the card to perform at least one of reading and recording of magnetic data. According to this structure, when the magnetic head is moved to perform reading and/or recording of magnetic data, a holding force for the card is increased by utilizing the IC contact springs. Therefore, positional displacement of the card is effectively prevented when the magnetic head is moved while abutting with the card and reading and/or recording of magnetic data are performed.

As described above, in the card reader in accordance with at least an embodiment of the present invention, even when a card with a magnetic stripe in conformity with the international standard and JIS standard is conveyed in its short-side direction and processed, lowering of reading accuracy and recording accuracy of magnetic data is restrained.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 6 is a side view for explaining arrangement relationship of a magnetic head, conveying rollers and an abutting part shown in FIG. 4 and the like.

DESCRIPTION OF EMBODIMENTS

An embodiment of the present invention will be described below with reference to the accompanying drawings.
(Structure of Card Reader)

Figure 1:
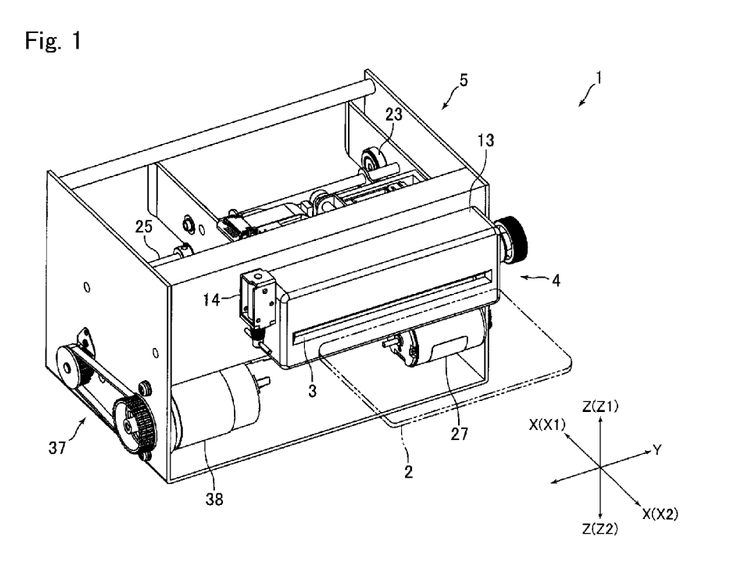
FIG. 1 is a perspective view showing a card reader in accordance with an embodiment of the present invention.
Figure 2:
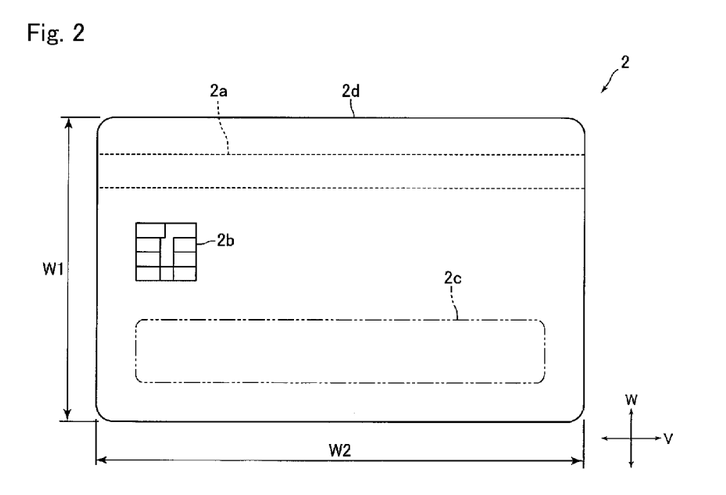
FIG. 2 is a plan view showing a card in FIG. 1.
Figure 3:
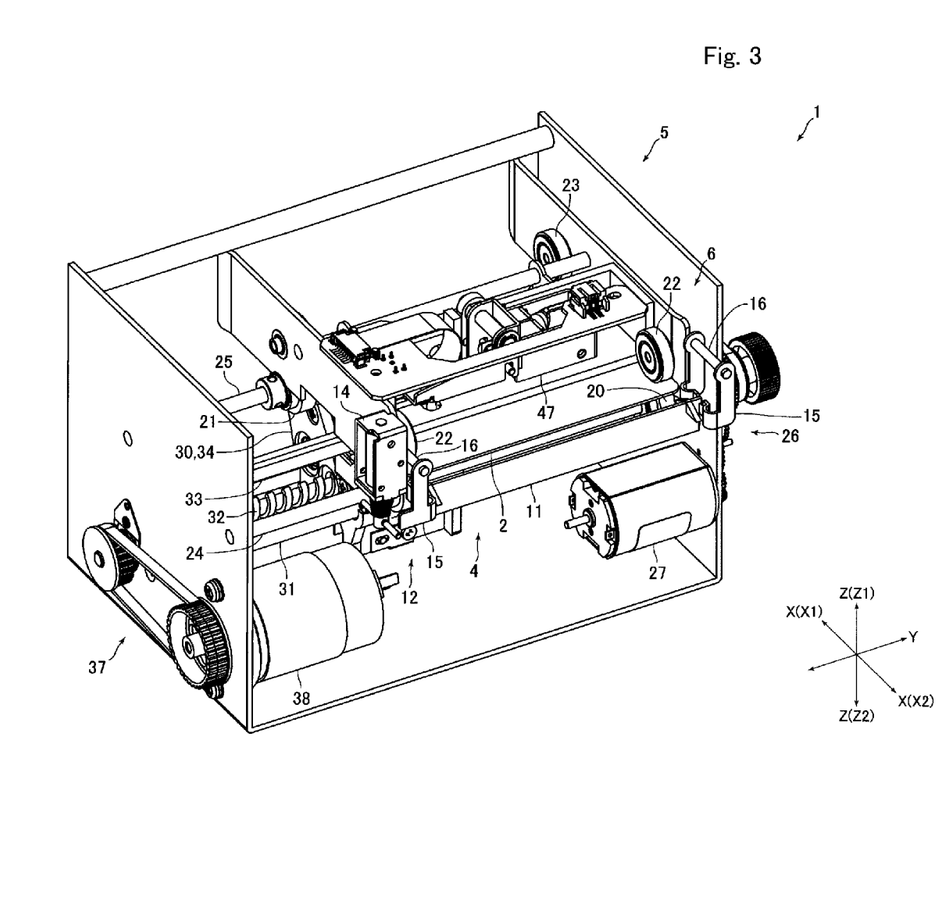
FIG. 3 is a perspective view showing a state that a cover member is detached from the card reader shown in FIG. 1.
Figure 4:
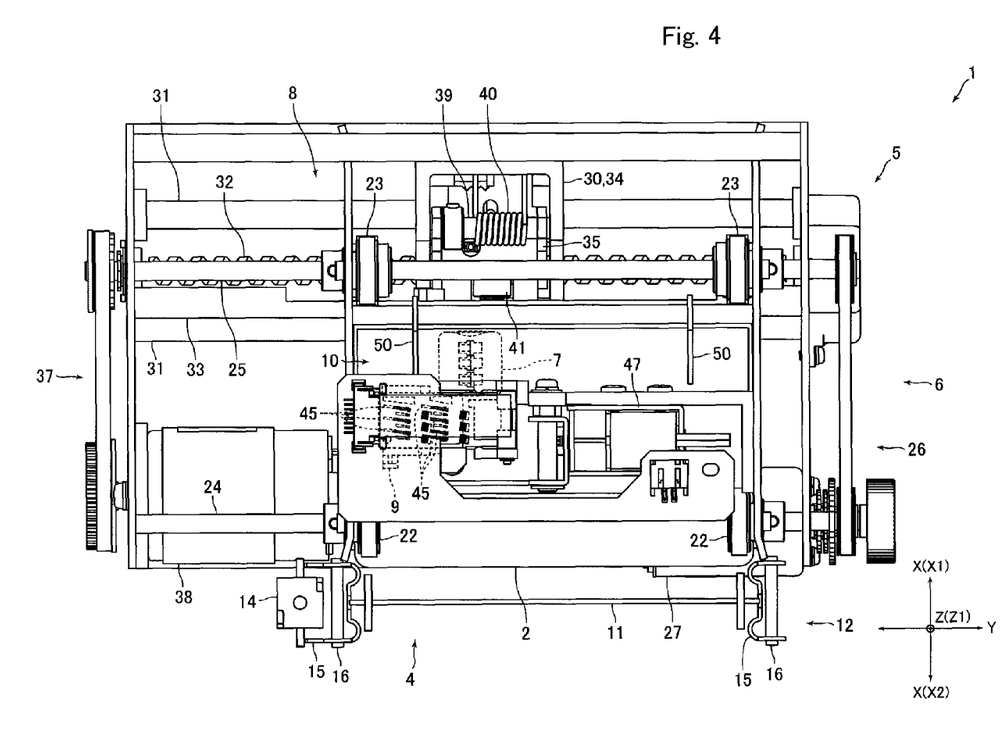
FIG. 4 is a plan view showing a state that a cover member is detached from the card reader shown in FIG. 1.
Figure 5:
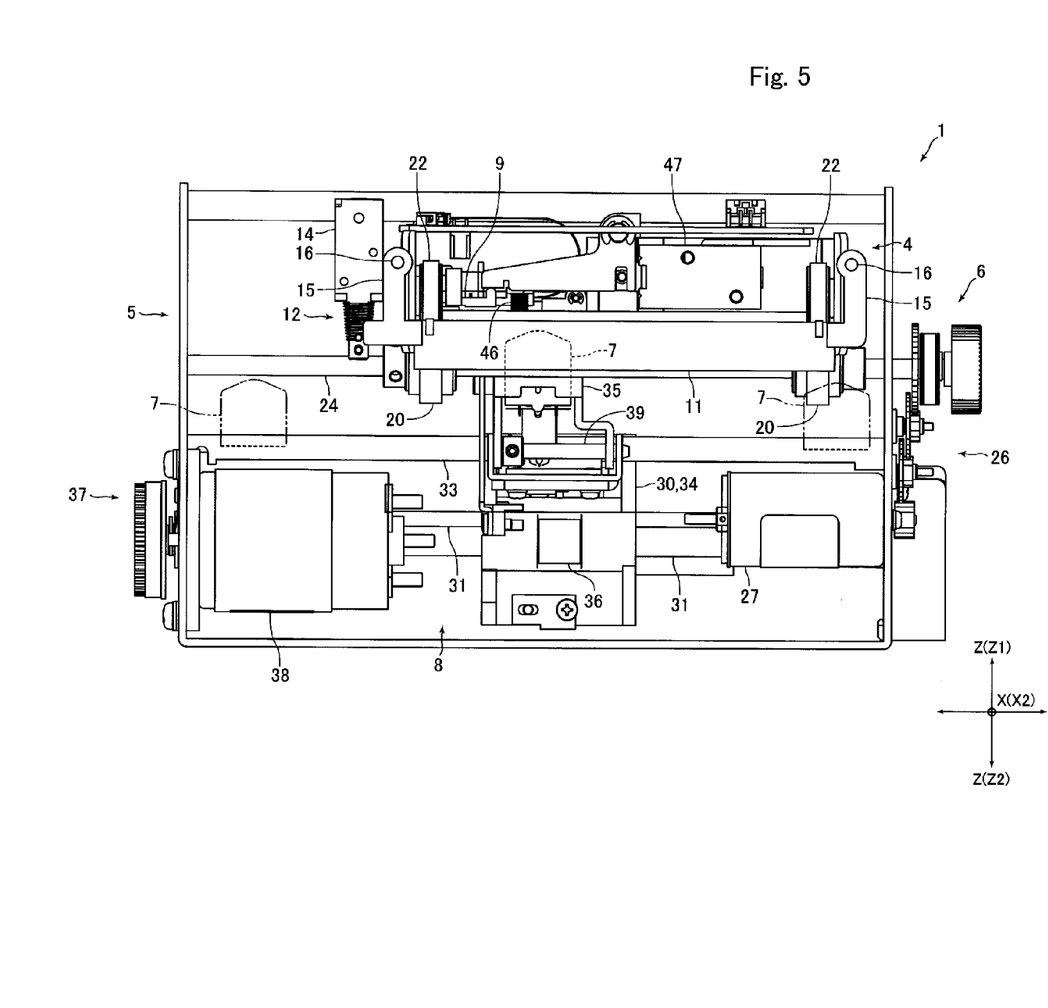
FIG. 5 is a front view showing a state that a cover member is detached from the card reader shown in FIG. 1.
Figure 6:
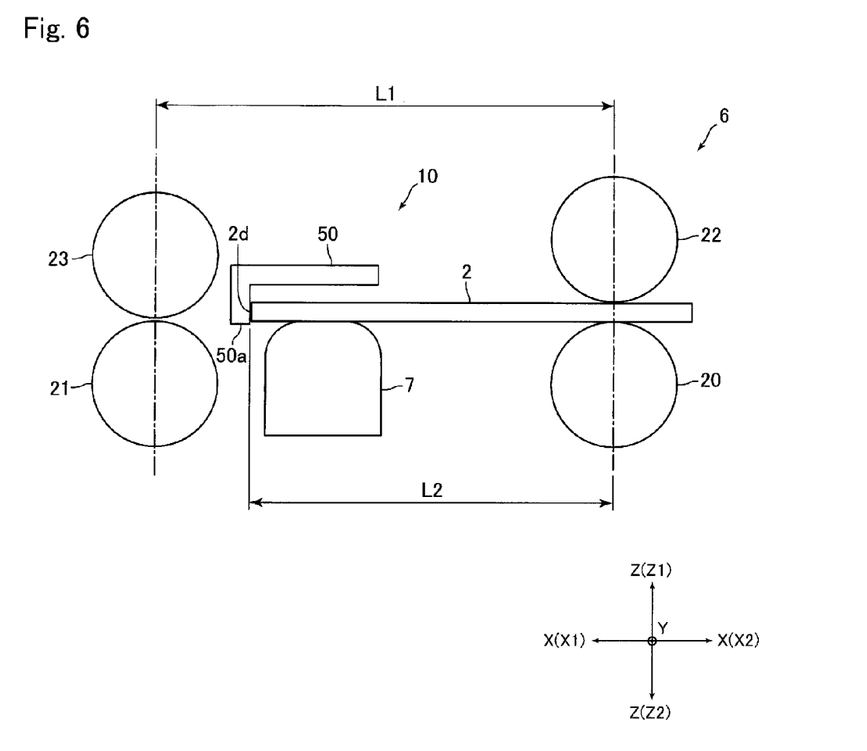

FIG. 1 is a perspective view showing a card reader 1 in accordance with an embodiment of the present invention. FIG. 2 is a plan view showing a card 2 in FIG. 1. FIG. 3 is a perspective view showing a state that a cover member 13 is detached from the card reader 1 shown in FIG. 1. FIG. 4 is a plan view showing a state that the cover member 13 is detached from the card reader 1 shown in FIG. 1. FIG. 5 is a front view showing a state that the cover member 13 is detached from the card reader 1 shown in FIG. 1. FIG. 6 is a side view for explaining arrangement relationship of a magnetic head 7, conveying rollers 20 and 21 and an abutting part 50a shown in FIG. 4 and the like.

The card reader 1 in this embodiment is a device for performing at least one of reading of magnetic data recorded on a card 2 and recording of magnetic data to a card 2 and is mounted and used in a predetermined host device such as an ATM (Automated Teller Machine). The card reader 1 includes a card insertion part 4, which is formed with an insertion port 3 into which a card 2 is inserted, and a main body part 5 which is formed with a card conveying passage where the card 2 is conveyed. The main body part 5 includes a card conveying mechanism 6 for conveying a card 2, a magnetic head 7 which is structured to abut with the card 2 and to perform reading of magnetic data recorded on the card 2 and recording of magnetic data to the card 2, a head moving mechanism 8 which is structured to move the magnetic head 7 in a direction perpendicular to a conveying direction of the card 2, an IC contact block 9 which is structured to contact with a terminal part 2b formed on the card 2 to exchange data, and a positioning mechanism 10 (see FIG. 4) for positioning the card 2 which is taken into the card reader 1.

A card 2 is a card made of vinyl chloride whose thickness is about 0.7-0.8 mm. A card 2 in this embodiment is a card with a magnetic stripe in conformity with the international standard (for example, ISO/IEC 7811) or JIS standard (for example, JISX 6302) and is formed in a substantially rectangular shape whose four corners are rounded. A rear face of a card 2 is formed with a magnetic stripe 2a in which magnetic data are recorded. Further, the card 2 is a contact type IC card and a front face of the card 2 is formed with a terminal part 2b comprised of eight external connection terminals. A part of the card 2 is formed with an embossing area 2c where embossing is performed.

The magnetic stripe 2a is formed in a long and narrow strip shape which is parallel to a longitudinal direction ("V" direction in FIG. 2) of the card 2 formed in a substantially rectangular shape. The magnetic stripe 2a is formed over the entire region in the longitudinal direction of the card 2. Further, the magnetic stripe 2a is formed on one end 2d side in the short-side direction ("W" direction in FIG. 2) of the card 2. Specifically, the magnetic stripe 2a is formed within a predetermined region with the one end 2d of the card 2 as a reference in the short-side direction of the card 2 based on the international standard or JIS standard. The terminal part 2b is formed on one end side in the longitudinal direction of the card 2 and at a roughly center position in the short-side direction of the card 2. Eight external connection terminals which structure the terminal part 2b are arranged in four lines in the short-side direction of the card 2 and in two rows in the longitudinal direction of the card 2. The embossing area 2c is disposed on the other end side in the short-side direction of the card 2. Further, the embossing area 2c is formed in a predetermined area except both end sides in the longitudinal direction of the card 2.

In this embodiment, a card 2 is conveyed in an "X" direction which is shown in FIG. 1 and the like. Specifically, a card 2 is taken in an "X1" direction and the card 2 is ejected in an "X2" direction. In other words, the "X" direction is a conveyance direction of a card 2, the "X1" direction is a taking-in direction of the card 2, and the "X2" direction is an ejection direction of the card 2. Further, in this embodiment, a card 2 is taken into the card reader 1 so that the short-side direction of the card 2 is coincided with the "X" direction. Further, the card 2 is conveyed in the card reader 1 so that the short-side direction of the card 2 is coincided with the "X" direction. In other words, the card reader 1 conveys a card 2 in the short-side direction of the card 2 to perform predetermined processing.

Further, a "Z" direction in FIG. 1 and the like which is perpendicular to the "X" direction is a thickness direction of a card 2 taken into the card reader 1, a "Y" direction in FIG. 1 and the like perpendicular to the "X" direction and the "Z" direction is a longitudinal direction of a card 2 which is normally taken into the card reader 1. In the following descriptions, the "X" direction is referred to as a "front and rear direction", the "Y" direction is referred to as a "right and left direction" and the "Z" direction is referred to as an "upper and lower direction". Further, the "X1" direction side is referred to as a "back" (rear) side, the "X2" direction side is referred to as a "front" side, the "Z1" direction side is referred to as an "upper" side, and the "Z2" direction side is referred to as a "lower" side.

The card insertion part 4 is attached to a front end face of the main body part 5. The card insertion part 4 includes a shutter member 11 structured to close a back side of the insertion port 3, and a card detection mechanism 12 for detecting a card 2 which is inserted into the card reader 1 (in other words, a card 2 having been inserted into the insertion port 3). The shutter member 11, the card detection mechanism 12 and a front face side of the main body part 5 are covered by a cover member 13.

The shutter member 11 is formed so as to close the whole of a back side of the insertion port 3. A solenoid 14 is connected with the shutter member 11. The shutter member 11 is moved up and down by power of the solenoid 14 between a close position where the back side of the insertion port 3 is closed and an open position where the back side of the insertion port 3 is opened. In this embodiment, in a standby state before a card 2 is inserted into the card reader 1, the shutter member 11 closes the back side of the insertion port 3 and, when it is detected by the card detection mechanism 12 that a card 2 is normally inserted into the card reader 1, the shutter member 11 opens the back side of the insertion port 3. Further, in this embodiment, as described below, the whole of a card 2 is taken into an inside of the card reader 1 and, when the card 2 inserted from the insertion port 3 is completely taken into the inside of the card reader 1, the shutter member 11 closes the back side of the insertion port 3. In accordance with an embodiment of the present invention, the shutter member 11 may be moved up and down by power of another drive source such as a motor between the close position where the back side of the insertion port 3 is closed and the open position where the back side of the insertion port 3 is opened.

The card detection mechanism 12 includes two detection levers 15 which are disposed on both end sides in the right and left direction of the card insertion part 4. An upper end side of the detection lever 15 is turnably supported by a fixed shaft 16 which is fixed with the front and rear direction as an axial direction. Further, the detection lever 15 is, for example, formed with a light intercepting part (not shown) for intercepting light between a light emitting element and a light receiving element of an optical sensor (not shown). When each of both ends in a longitudinal direction of a card 2 is contacted with each of two detection levers 15 which are disposed on both right and left end sides of the card insertion part 4 to turn the detection lever 15 with the fixed shaft 16 as a turning center, the light intercepting part of the detection lever 15 intercepts light between the light emitting element and the light receiving element of the optical sensor.

In this embodiment, when both of two detection levers 15 intercept light between the light emitting element and the light receiving element of the optical sensor, the card 2 is detected to be normally inserted into the card reader 1. In other words, in this embodiment, the card detection mechanism 12 detects that a card 2 is normally inserted into the card reader 1 by detecting both ends in a longitudinal direction of the card 2. Further, when the card detection mechanism 12 detects that the card 2 is normally inserted into the card reader 1, as described above, the shutter member 11 opens the back side of the insertion port 3 and a motor 27 described below is started to make conveying rollers 20 and 21 rotate.

The card conveying mechanism 6 includes the conveying rollers 20 and 21 structured to abut with an under face of a card 2 to convey the card 2, and pad rollers 22 and 23 oppositely disposed to the conveying rollers 20 and 21 from an upper side. The conveying roller 20 is disposed on the front face side of the main body part 5 and the conveying roller 21 is disposed on the rear face side of the main body part 5. A distance "L1" (see FIG. 6) in the front and rear direction between the center of the conveying roller 20 and the center of the conveying roller 21 is slightly shorter than a width "W1" in the short-side direction of a card 2 (see FIG. 2). Further, the conveying rollers 20 and 21 are disposed on both end sides in the right and left direction of the card conveying passage. The conveying rollers 20 disposed on both end sides in the right and left direction of the card conveying passage are fixed to a rotation shaft 24, and the conveying rollers 21 disposed on both end sides in the right and left direction of the card conveying passage are fixed to a rotation shaft 25. The rotation shafts 24 and 25 are connected with a motor 27 through a power transmission mechanism 26 structured of a belt, a pulley, a gear train and the like. In accordance with an embodiment of the present invention, it may be structured that the conveying rollers 20 and 21 are abutted with an upper face of a card 2 and the pad rollers 22 and 23 are oppositely disposed to the conveying rollers 20 and 21 from a lower side.

The pad roller 22 is urged toward the conveying roller 20 and is capable of abutting with a card 2 from an upper side. The pad roller 23 is urged toward the conveying roller 21 and is capable of abutting with the card 2 from an upper side. As described above, the conveying rollers 20 and 21 are disposed on both end sides in the right and left direction of the card conveying passage, and the conveying rollers 20 and 21 are abutted with a lower face on both end sides in a longitudinal direction of the card 2 and the pad rollers 22 and 23 are abutted with an upper face on both end sides in the longitudinal direction of the card 2. Specifically, the conveying rollers 20 and 21 and the pad rollers 22 and 23 are abutted with portions of a card 2 avoiding its embossing area 2c on both end sides in its longitudinal direction. In this embodiment, the conveying roller 21 is a second conveying roller and the pad roller 23 is a second pad roller.

The head moving mechanism 8 includes a carriage 30 on which the magnetic head 7 is mounted, a guide shaft 31 which guides the carriage 30 in the right and left direction, a lead screw 32 structured to move the carriage 30 in the right and left direction, and a cam plate 33 for moving the magnetic head 7 up and down. The carriage 30 is provided with a carriage main body 34 and a head holding member 35 to which the magnetic head 7 is fixed. The carriage main body 34 is attached with a female screw member (not shown) which is engaged with the lead screw 32 and a slide bearing 36 (see FIG. 5) which is engaged with the guide shaft 31. The lead screw 32 is connected with a motor 38 through a power transmission mechanism 37 structured of a pulley, a belt and the like.

The carriage main body 34 is fixed with a fixed shaft 39 which turnably holds the head holding member 35 with the right and left direction as its axial direction. A torsion coil spring 40 (see FIG. 4) is disposed between the carriage main body 34 and the head holding member 35 and the head holding member 35 is urged by an urging force of the torsion coiled spring 40 in a direction so as to move the magnetic head 7 toward an upper side with the fixed shaft 39 as a turning center. The cam plate 33 is formed in a long shape which is long and narrow in the right and left direction and the head holding member 35 is rotatably attached with a roller 41 (see FIG. 4) which is capable of abutting with cams (not shown) attached on both end sides of the cam plate 33 in the right and left direction. The magnetic head 7 is disposed between the conveying roller 20 and the pad roller 22, and the conveying roller 21 and the pad roller 23 in the front and rear direction.

In this embodiment, when the motor 38 is driven and the lead screw 32 is rotated, the carriage 30 is moved in the right and left direction along the guide shaft 31. On both end sides in the right and left direction, the roller 41 is abutted with the cam which is attached on both end sides of the cam plate 33 and, as shown by the two-dot chain line in FIG. 5, the magnetic head 7 is retreated to a lower side with respect to the card conveying passage against an urging force of the torsion coil spring 40. On the other hand, when the roller 41 is disengaged from the cam which is attached on both end sides of the cam plate 33, the magnetic head 7 having been guided by the cam so as to retreat to a lower side with respect to the card conveying passage is moved upward by an urging force of the torsion coil spring 40 and the magnetic head 7 is capable of abutting with a magnetic stripe 2a of a card 2. When the carriage 30 is moved in the right and left direction while the magnetic head 7 is abutted with the magnetic stripe 2a, reading and/or recording of magnetic data are performed by the magnetic head 7. The magnetic head 7 is connected with a control circuit board of the card reader 1 through a predetermined cable.

The IC contact block 9 includes IC contact springs 45 (see FIG. 4) which are capable of contacting with respective external connection terminals structuring the terminal part 2b of a card 2. The IC contact block 9 is held by a holder. The holder is capable of being turned with a predetermined supporting point as a turning center and, when the holder is turned around the supporting point, the IC contact block 9 is moved up and down. The IC contact block 9 is urged to an upper direction where the IC contact springs 45 are retreated from the card conveying passage by an urging force of a compression coil spring 46 (see FIG. 5). Further, a solenoid 47 is connected with the holder which holds the IC contact block 9 and, for example, when the solenoid 47 is driven, the IC contact block 9 is moved downward against an urging force of the compression coil spring 46 so that the IC contact springs 45 are capable of contacting with the external connection terminals which structure the terminal part 2*b*.

The positioning mechanism 10 includes a positioning member 50 which is formed with an abutting part 50*a* structured to abut with a rear end of a card 2 having been taken into the card reader 1, and a retreating mechanism (not shown) for retreating the abutting part 50*a* from the card conveying passage. The abutting part 50*a* is disposed on a back side with respect to the magnetic head 7 in the front and rear direction. Further, the abutting part 50*a* is disposed on a front side with respect to the conveying roller 21 and the pad roller 23 in the front and rear direction. As described above, the distance "L1" in the front and rear direction between the center of the conveying roller 20 and the center of the conveying roller 21 is slightly shorter than the width "W1" in the short-side direction of a card 2, and a distance "L2" (see FIG. 6) in the front and rear direction between the center of the conveying roller 20 and a front face of the abutting part 50*a* is shorter than the width "W1" in the short-side direction of the card 2. Further, a distance in the front and rear direction between the insertion port 3 and the front face of the abutting part 50*a* is set to be longer than the width "W1" in the short-side direction of the card 2. Further, a distance in the front and rear direction between the shutter member 11 and the front face of the abutting part 50*a* is shorter than a width "W2" in a longitudinal direction of the card 2.

The retreating mechanism includes a predetermined link mechanism, a drive source and the like and moves the positioning member 50 between an abutting position where a rear end of a card 2 is capable of abutting with the abutting part 50*a*, and a retreated position where the abutting part 50*a* is retreated from the card conveying passage and the card 2 is capable of passing toward the conveying roller 21 and the pad roller 23. In this embodiment, the positioning member 50 is normally located at the abutting position and, when a predetermined processing is to be performed, the positioning member 50 is moved to the retreated position.

In the card reader 1 structured as described above, one end 2*d* side of a card 2 is inserted into the insertion port 3 in a state that a front face of a card 2 is directed to an upper side and, when both ends in the longitudinal direction of the card 2 are detected by the card detection mechanism 12, the shutter member 11 opens a back side of the insertion port 3. Further, the motor 27 is activated and the card 2 is conveyed by the card conveying mechanism 6 until the one end 2*d* of the card 2 is abutted with the abutting part 50*a*. After that, the motor 38 is activated and the magnetic head 7 is moved in the right and left direction while abutting with the magnetic stripe 2*a* of the card 2 to perform reading and/or recording of magnetic data.

As described above, the distance "L2" in the front and rear direction between the center of the conveying roller 20 and the front face of the abutting part 50*a* is set to be shorter than the width "W1" in the short-side direction of the card 2 and, in a state that the one end 2*d* of the card 2 is abutted with the abutting part 50*a*, a front end side of the card 2 is sandwiched between the conveying roller 20 and the pad roller 22. In this embodiment, the magnetic head 7 is moved in the right and left direction to perform reading and/or recording of magnetic data while the card 2 is held between the conveying roller 20 and the pad roller 22 in the state that the card conveying mechanism 6 presses the one end 2*d* of the card 2 against the abutting part 50*a*. Further, as described above, a distance in the front and rear direction between the insertion port 3 and the front face of the abutting part 50*a* is set to be longer than the width "W1" in the short-side direction of the card 2 and thus, in the state that the one end 2*d* of the card 2 is abutted with the abutting part 50*a*, the entire card 2 is taken into the inside of the card reader 1.

Further, when the IC contact springs 45 are contacted with the external connection terminals structuring the terminal part 2*b* of a card 2 for exchanging data with the card 2, the IC contact block 9 is moved downward in a state that the one end 2*d* of the card 2 is pressed against the abutting part 50*a* while the card 2 is held between the conveying roller 20 and the pad roller 22 and thereby the IC contact springs 45 are contacted with the external connection terminals. In this case, the IC contact springs 45 are contacted with the external connection terminals at a predetermined contact pressure.

Principal Effects in this Embodiment

As described above, in this embodiment, in a state that the card conveying mechanism 6 presses the one end 2*d* of a card 2 against the abutting part 50*a*, the magnetic head 7 is moved in the right and left direction while the card 2 is held between the conveying roller 20 and the pad roller 22 to perform reading and/or recording of magnetic data. In other words, in this embodiment, in a card 2 with a magnetic stripe 2*a* in conformity with the international standard and JIS standard, while the card 2 is held in a state that the one end 2*d* of the card 2, which is the reference of a forming region of the magnetic stripe 2*a*, is pressed against the abutting part 50*a*, reading and/or recording of magnetic data are performed by moving the magnetic head 7. Therefore, aligning of the magnetic head 7 with the magnetic stripe 2*a* is performed with a high degree of accuracy before reading and/or recording of magnetic data are performed and, in addition, positional displacement of the card 2 is capable of being prevented when reading and/or recording of magnetic data are performed while the magnetic head 7 is abutted with the card 2 and moved along the card 2. As a result, according to this embodiment, even when a card 2 with a magnetic stripe in conformity with the international standard and JIS standard is conveyed in its short-side direction and processed, lowering of reading accuracy and recording accuracy of magnetic data is restrained.

Further, in this embodiment, in a state that the one end 2*d* of a card 2 is pressed against the abutting part 50*a*, the IC contact block 9 is moved downward to contact the IC contact springs 45 with the external connection terminals while the card 2 is held between the conveying roller 20 and the pad roller 22. Therefore, aligning of the external connection terminals with the IC contact springs 45 before exchanging data is performed with a high degree of accuracy and, in addition, positional displacement of the card 2 is prevented when data are exchanged. A dimensional tolerance of the external connection terminals in the short-side direction of a card 2 is severer than a dimensional tolerance of the external connection terminals in the longitudinal direction of the card 2. However, in this embodiment, aligning of the external connection terminals with the IC contact springs 45 before exchanging data is performed with a high degree of accuracy and, in addition, positional displacement of the card 2 is prevented during exchanging of data and thus the external connection terminals and the IC contact springs 45 are appropriately contacted with each other and data are appropriately exchanged.

In this embodiment, the conveying roller 20 and the pad roller 22 are abutted with portions of a card 2 on both end sides in its longitudinal direction so as to avoid the embossing area 2*c*. Therefore, when reading and/or recording of magnetic data are to be performed or, when the external connection terminals and the IC contact springs 45 are contacted with each other for exchanging data, a flat portion avoiding the embossing area 2c of a card 2 is held between the conveying roller 20 and the pad roller 22 and, as a result, a holding force for the card 2 can be increased. Accordingly, in this embodiment, when reading and/or recording of magnetic data are performed while the magnetic head 7 is abutted with a card 2 and moved along the card 2 or, when the external connection terminals and the IC contact springs 45 are contacted with each other for exchanging data, positional displacement of the card 2 is effectively prevented. Further, in this embodiment, the conveying rollers 20 and 21 and the pad rollers 22 and 23 are abutted with portions of a card 2 which avoid the embossing area 2c on both end sides in the longitudinal direction. Therefore, the conveying rollers 20 and 21 and the pad rollers 22 and 23 do not abut with the embossment which is formed by embossing. Accordingly, in this embodiment, damage of the embossment or damage of coating on the embossed portion are prevented.

In this embodiment, the card detection mechanism 12 detects that a card 2 is normally inserted into the card reader 1 by detecting both ends in the longitudinal direction of the card 2. Further, in this embodiment, when it is detected by the card detection mechanism 12 that a card 2 is normally inserted into the card reader 1, the shutter member 11 opens the back side of the insertion port 3 and the conveying rollers 20 and 21 are rotated. On the other hand, when it is not detected that a card 2 is normally inserted into the card reader 1, the shutter member 11 maintains the closed state on the back side of the insertion port 3 and the conveying rollers 20 and 21 are not rotated. Therefore, in this embodiment, for example, in a case that a card 2 is inserted into the card reader 1 so that a longitudinal direction of the card 2 is coincided with the front and rear direction and that both ends in the longitudinal direction of the card 2 are not detected by the card detection mechanism 12, the card 2 is not taken into the inside of the card reader 1. Accordingly, in this embodiment, even when a criminal attaches a magnetic head for skimming to a front side of the insertion port 3, illegal acquisition of magnetic data by the magnetic head for skimming is prevented. Further, in a case that a card 2 is inserted into the card reader 1 so that a longitudinal direction of the card 2 is coincided with the front and rear direction and that both ends in the longitudinal direction of the card 2 are not detected by the card detection mechanism 12, the card 2 is not taken into the inside of the card reader 1. Therefore, an operation is prevented in which the magnetic head 7 is moved in a short-side direction of the card 2 in the inside of the card reader 1 to scratch the magnetic stripe 2a in the short-side direction of the card 2. If the magnetic stripe 2a is scratched in the short-side direction of the card 2, a reading error of magnetic data is easily occurred but, in this embodiment, an operation is not occurred that the magnetic head 7 is moved in the short-side direction of the card 2 in the inside of the card reader 1 and thus the magnetic stripe 2a is not scratched in the short-side direction of the card 2.

In this embodiment, a distance between the insertion port 3 and the front face of the abutting part 50a in the front and rear direction is set to be longer than the width "W1" in the short-side direction of a card 2 and, in a state that the one end 2d of the card 2 is abutted with the abutting part 50a, the entire card 2 is taken into the inside of the card reader 1. Therefore, in this embodiment, when reading and/or recording of magnetic data are performed or, when the external connection terminals and the IC contact springs 45 are contacted with each other for exchanging data, the card 2 is prevented from being pulled out from the card reader 1. As a result, in this embodiment, appropriate reading and/or recording of magnetic data are performed and data are appropriately exchanged between the external connection terminals and the IC contact springs 45.

Especially, in this embodiment, when a card 2 inserted through the insertion port 3 has been completely taken into the inside of the card reader 1, the shutter member 11 closes the back side of the insertion port 3. Therefore, when reading and/or recording of magnetic data are performed or, when the external connection terminals and the IC contact springs 45 are contacted with each other and data are exchanged, the card 2 is surely prevented from being pulled out from the card reader 1. Accordingly, in this embodiment, appropriate reading and/or recording of magnetic data are surely performed and data are surely appropriately exchanged between the external connection terminals and the IC contact springs 45.

Further, in this embodiment, a distance in the front and rear direction between the shutter member 11 and the front face of the abutting part 50a is shorter than the width "W2" in the longitudinal direction of a card 2. Therefore, in a case that a card 2 is inserted into the card reader 1 so that the longitudinal direction of the card 2 is coincided with the front and rear direction, even when the rear end of the card 2 is abutted with the front face of the abutting part 50a, the shutter member 11 is unable to close the back side of the insertion port 3. Accordingly, it can be detected whether or not a card 2 is inserted into the card reader 1 so that the short-side direction of the card 2 is coincided with the front and rear direction by detecting a state of the shutter member 11. Further, in a case that it is detected on the basis of the state of the shutter member 11 that a card 2 is not inserted into the card reader 1 so that the short-side direction of the card 2 is coincided with the front and rear direction, the magnetic head 7 is set to be not moved and thereby the magnetic stripe 2a is prevented from being scratched in the short-side direction of the card 2.

In this embodiment, the conveying roller 21 and the pad roller 23 are disposed on the back side with respect to the abutting part 50a, and the distance "L1" between the conveying roller 20 and the conveying roller 21 in the front and rear direction is set to be slightly shorter than the width "W1" in the short-side direction of a card 2. Further, in this embodiment, the positioning member 50 is movable to a retreated position where the abutting part 50a is retreated from the card conveying passage so that a card 2 can be passed toward the conveying roller 21 and the pad roller 23. Therefore, in this embodiment, when the positioning member 50 is moved to the retreated position, the card 2 can be conveyed to further back side of the card reader 1 by the conveying roller 21 and the pad roller 23. Accordingly, in this embodiment, various operations can be performed on a card 2, and/or a card 2 can be collected on the back side of the card reader 1. In other words, for example, when a character printer for printing characters on a front face of a card 2 is disposed on the back side of the card reader 1, a card 2 can be conveyed toward the character printer and printing is performed on the card 2. Further, for example, when a card collection storage for collecting a card 2 is disposed on the back side of the card reader 1, a card 2 is conveyed toward the card collection storage to collect the card 2 in the card collection storage.

In accordance with an embodiment of the present invention, in a state that the IC contact block 9 is moved downward and the external connection terminals are pressed down by the IC contact springs 45, the magnetic head 7 may be moved in the right and left direction to perform reading and/or recording of magnetic data. In this case, a holding force for the card 2 when the magnetic head 7 is moved to perform reading and/or recording of magnetic data is increased by utilizing the IC contact springs 45. Therefore, in this case, when the magnetic head 7 is moved while abutting with the card 2 and reading and/or recording of magnetic data are performed, positional displacement of the card 2 is effectively prevented.

OTHER EMBODIMENTS

Although the present invention has been shown and described with reference to a specific embodiment, various changes and modifications will be apparent to those skilled in the art from the teachings herein.

In the embodiment described above, an encoder for detecting a rotational state of the conveying roller 20 may be provided. In this case, it can be detected by using the encoder whether the conveying roller 20 holding a card 2 is moved or not when reading and/or recording of magnetic data are performed (in other words, whether the card 2 is moved or not when reading and/or recording of magnetic data are performed) in a state that the one end 2d of the card 2 is pressed against the abutting part 50a. Therefore, in a case that movement of the card 2 is detected on the basis of a detection result of the encoder when reading and/or recording of magnetic data are performed, a predetermined processing is performed to effectively restrain lowering of reading accuracy and/or recording accuracy of magnetic data.

In the embodiment described above, the card conveying mechanism 6 is structured of the conveying rollers 20 and 21, the pad rollers 22 and 23, and the like. However, the present invention is not limited to this embodiment. For example, the card conveying mechanism 6 may be structured of a belt and the like which are abutted with an upper face or an under face of a card 2 to convey the card 2. Further, the card conveying mechanism 6 may be structured of a holding mechanism which holds a card 2, a moving mechanism which moves the holding mechanism in the front and rear direction, and the like.

In the embodiment described above, the card detection mechanism 12 is structured of the detection lever 15, an optical sensor which detects an operation of the detection lever 15, and the like. However, the present invention is not limited to this embodiment. For example, the card detection mechanism 12 may be structured of the detection lever 15, a micro switch which detects an operation of the detection lever 15, and the like. Further, the card detection mechanism 12 may be structured of an optical sensor including a light emitting element and a light receiving element which are disposed in the upper and lower direction across a portion of the card conveying passage where a card 2 is passed. Alternatively, the card detection mechanism 12 may be structured of a micro switch which is disposed at a position where an end part in the longitudinal direction of a card 2 is abutted, and the like.

In the embodiment described above, the card reader 1 is structured so that the entire card 2 is taken into the inside of the card reader 1 in a state that the one end 2d of a card 2 is abutted with the abutting part 50a. However, the present invention is not limited to this embodiment. For example, the card reader 1 may be structured so that, in a state that the one end 2d of a card 2 is abutted with the abutting part 50a, a part on the front end side of the card 2 is exposed to the outside from the card reader 1.

In the embodiment described above, the positioning member 50 is capable of being moved to a retreated position where the abutting part 50a is retreated from the card conveying passage and a card 2 can be passed toward the conveying roller 21 and the pad roller 23. However, the present invention is not limited to this embodiment. For example, the positioning member 50 may be fixed at an abutting position where the one end 2d of a card 2 can be abutted with the abutting part 50a. In this case, the card conveying mechanism 6 is not required to have the conveying roller 21 and the pad roller 23.

In the embodiment described above, the motor 27 for driving the conveying rollers 20 and 21 and the motor 38 for driving the carriage 30 are separately provided. However, the present invention is not limited to this embodiment. For example, a common motor may be used for driving the conveying rollers 20 and 21 and for driving the carriage 30. In this case, a switching mechanism for switching a transmission path of power from a motor may be provided between the conveying rollers 20 and 21 and the carriage 30 and the motor.

In the embodiment described above, the card 2 is a rectangular card made of vinyl chloride whose thickness is about 0.7-0.8 mm. However, the present invention is not limited to this embodiment. For example, a card 2 having such rigidity that the card 2 is not deformed when its one end 2d is pressed against the abutting part 50a may be used and, specifically, the card 2 may be a PET (polyethylene terephthalate) card whose thickness is about 0.18-0.36 mm or may be a paper card having a predetermined thickness. Further, in the embodiment described above, the card reader 1 includes the IC contact block 9 but the card reader 1 may be provided with no IC contact block 9.

In the embodiment described above, a magnetic stripe 2a is formed on a rear face of a card 2. However, the present invention is not limited to this embodiment. For example, instead of the rear face of a card 2 or, in addition to the rear face of a card 2, a magnetic stripe may be formed on a front face of the card 2. For example, a magnetic stripe in conformity with the standard of JISX6302 may be formed on a front face of a card 2. In a case that a magnetic stripe is formed on only the front face of a card 2, the magnetic head 7 is disposed on an upper side of the card conveying passage. Further, in a case that a magnetic stripe is formed on the front face of a card 2 in addition to the magnetic stripe 2a, the magnetic head 7 is disposed on both of an upper side and a lower side with respect to the card conveying passage. In the embodiment described above, the IC contact block 9 and the positioning mechanism 10 are disposed on an upper side with respect to a card conveying passage. However, in a case that the magnetic head 7 is disposed on an upper side with respect to a card conveying passage, the IC contact block 9 and the positioning mechanism 10 may be disposed at positions so as not to interfere with the magnetic head 7 and the head moving mechanism 8.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader in which a card formed in a substantially rectangular shape is conveyed in a short-side direction of the card and processed, comprising:
   a card conveying mechanism structured to convey the card;
   a magnetic head which is structured to abut with the card and performs at least one of reading of magnetic data recorded on the card and recording of magnetic data on the card;

a head moving mechanism structured to move the magnetic head in a longitudinal direction of the card; and
an abutting part structured to abut with one end of the card in the short-side direction of the card;
wherein, the card conveying mechanism holds the card in a state that the one end of the card in the short-side direction of the card is pressed against the abutting part while the magnetic head is moved in the longitudinal direction of the card to perform at least one of reading and recording of magnetic data.

2. The card reader according to claim 1, wherein
the card conveying mechanism includes a conveying roller, which is structured to abut with the card to convey the card, and a pad roller which is urged toward the conveying roller, and
the conveying roller and the pad roller hold the card between the conveying roller and the pad roller in the state that the one end of the card in the short-side direction of the card is pressed against the abutting part.

3. The card reader according to claim 2, wherein
the card is provided with an embossing area where embossing is performed, and
the conveying roller and the pad roller are abutted with a portion of the card avoiding the embossing area on both end sides of the card in the longitudinal direction of the card.

4. The card reader according to claim 2, further comprising:
a card conveying passage where the card is conveyed; and
a retreating mechanism by which the abutting part is retreated from the card conveying passage,
wherein the card conveying mechanism includes a second conveying roller, which is disposed on a back side with respect to the abutting part in a taking-in direction of the card and is structured to abut with the card and convey the card, and a second pad roller which is urged toward the second conveying roller.

5. The card reader according to claim 1, further comprising a card detection mechanism for detecting that the card is inserted into the card reader,
wherein the card detection mechanism detects that the card is inserted into the card reader by detecting both end sides of the card in a longitudinal direction of the card.

6. The card reader according to claim 1, further comprising a card insertion part in which an insertion port into which the card is inserted is formed,
wherein the card insertion part includes a shutter member structured to close a back side of the insertion port in a taking-in direction of the card.

7. The card reader according to claim 1, wherein, in a state that the one end of the card in the short-side direction of the card is abutted with the abutting part, the entire card is taken into an inside of the card reader.

8. The card reader according to claim 1, further comprising IC contact springs structured to contact with external connection terminals formed on the card,
wherein, while the card conveying mechanism holds the card in a state that the one end of the card in the short-side direction of the card is pressed against the abutting part, the IC contact springs are contacted with the external connection terminals to exchange data.

9. The card reader according to claim 1, further comprising IC contact springs structured to contact with external connection terminals formed on the card, wherein, in a state that the IC contact springs press the external connection terminals, the magnetic head is moved in the longitudinal direction of the card to perform at least one of reading and recording of magnetic data.

* * * * *